US012681255B2

(12) United States Patent
Chiasson

(10) Patent No.: US 12,681,255 B2
(45) Date of Patent: Jul. 14, 2026

(54) RIBBON PRINT SCHEME UTILIZING COLOR POINTERS

(71) Applicant: CORNING RESEARCH & DEVELOPMENT CORPORATION, Corning, NY (US)

(72) Inventor: David Wesley Chiasson, Edmonton (CA)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 250 days.

(21) Appl. No.: 18/229,862

(22) Filed: Aug. 3, 2023

(65) Prior Publication Data

US 2023/0375798 A1 Nov. 23, 2023

Related U.S. Application Data

(63) Continuation of application No. PCT/US2022/018295, filed on Mar. 1, 2022.

(60) Provisional application No. 63/155,864, filed on Mar. 3, 2021.

(51) Int. Cl.
*G02B 6/44* (2006.01)

(52) U.S. Cl.
CPC ........... *G02B 6/4482* (2013.01); *G02B 6/448* (2013.01); *G02B 6/4486* (2013.01)

(58) Field of Classification Search
CPC ..... G02B 6/4482; G02B 6/448; G02B 6/4486
USPC ........................................................ 385/114
See application file for complete search history.

(56) References Cited

U.S. PATENT DOCUMENTS

| | | | |
|---|---|---|---|
| 5,076,881 | A | 12/1991 | Ferguson |
| 5,809,195 | A | 9/1998 | Brown et al. |
| 10,185,110 | B2 | 1/2019 | Kaneko et al. |
| 10,393,983 | B2 | 8/2019 | Isaji et al. |
| 10,585,255 | B2 | 3/2020 | Sato et al. |
| 2002/0181990 | A1 | 12/2002 | Richard |

(Continued)

FOREIGN PATENT DOCUMENTS

| | | |
|---|---|---|
| JP | 09-184949 A | 7/1997 |
| WO | 2019/137627 A1 | 7/2019 |

OTHER PUBLICATIONS

International Search Report and Written Opinion of the International Searching Authority; PCT/US2022/018295; mailed on Jun. 21, 2022, 14 pages; International Searching Authority.

(Continued)

*Primary Examiner* — Jerry M Blevins
(74) *Attorney, Agent, or Firm* — Thomas R. Irwin

(57) ABSTRACT

Embodiments of the disclosure relate to an optical fiber ribbon. The optical fiber ribbon includes a plurality of optical fibers. Each optical fiber of the plurality of optical fibers is arranged adjacently to at least one other optical fiber of the plurality of optical fibers. The plurality of optical fibers have a planar configuration with a first side and a second side. The optical fiber ribbon also includes a first set of pointers disposed on the first side, the second side, or both the first side and the second side. The first set of pointers includes a first starter pointer and at least three first identifier pointers. The first starter pointer is configured to identify a start of an identification sequence for the optical fiber ribbon defined by the at least three first identifier pointers.

20 Claims, 3 Drawing Sheets

(56) References Cited

U.S. PATENT DOCUMENTS

| | | | |
|---|---|---|---|
| 2002/0197032 A1* | 12/2002 | Conrad | G02B 6/4482 |
| | | | 385/114 |
| 2015/0023640 A1 | 1/2015 | Blazer et al. | |
| 2016/0299310 A1 | 10/2016 | Kaneko et al. | |
| 2017/0090135 A1 | 3/2017 | Sato et al. | |
| 2018/0292623 A1 | 10/2018 | Isaji et al. | |
| 2019/0204519 A1 | 7/2019 | Sato et al. | |
| 2020/0142144 A1 | 5/2020 | Blazer et al. | |
| 2020/0386961 A1 | 12/2020 | Fallahmohammadi et al. | |
| 2021/0053338 A1 | 2/2021 | Sekine et al. | |
| 2021/0286143 A1* | 9/2021 | Kondapalli | G02B 6/448 |

OTHER PUBLICATIONS

European Patent Application No. 22763878.0 Extended European Search Report dated Dec. 3, 2024; 9 Pages; European Patent Office.

* cited by examiner

RIBBON PRINT SCHEME UTILIZING COLOR POINTERS

CROSS-REFERENCE TO RELATED APPLICATION

This application is a continuation of International Application No. PCT/US2022/018295 filed Mar. 1, 2022, which claims the benefit of priority under 35 U.S.C. § 119 of U.S. Provisional Application No. 63/155,864, filed on Mar. 3, 2021, the contents of which are relied upon and incorporated herein by reference in their entireties.

BACKGROUND

The disclosure relates generally to optical fiber ribbons, and specifically to a ribbon identification pointer system. A single optical fiber cable may contain many optical fibers (indeed, thousands of optical fibers), and during fabrication and installation of a fiber optic cable network, managing the connections between the optical fibers can be difficult. Thus, various portions of the optical fiber cable, such as individual optical fibers, buffer tubes, or groups of ribbons, may be color coded and/or marked for the purposes of identification when making such connections. Further, the optical fiber cable may contain optical fibers arranged in ribbons to allow for multiple optical fibers to be grouped and to be fusion spliced together in a single operation. However, arranging optical fibers into ribbons may lead to larger cable designs than if the optical fibers were loosely contained within the optical fiber cable.

SUMMARY

According to an aspect, embodiments of the disclosure relate to an optical fiber ribbon. The optical fiber ribbon includes a plurality of optical fibers. Each optical fiber of the plurality of optical fibers is arranged adjacently to at least one other optical fiber of the plurality of optical fibers. The plurality of optical fibers have a planar configuration with a first side and a second side. The optical fiber ribbon also includes a first set of pointers disposed on the first side, the second side, or both the first side and the second side. The first set of pointers includes a first starter pointer and at least three first identifier pointers. The first starter pointer is configured to identify a start of an identification sequence for the optical fiber ribbon defined by the at least three first identifier pointers.

According to another aspect, embodiments of the disclosure relate to a method of identifying an optical fiber ribbon. The optical fiber ribbon includes a plurality of optical fibers, and each optical fiber of the plurality of optical fibers is arranged adjacently to at least one other optical fiber of the plurality of optical fibers. The plurality of optical fibers have a planar configuration with a first side and a second side. In the method, a first starter pointer is formed on the first side of the optical fiber ribbon. Further, at least three first identifier pointers are formed on the first side of the optical fiber ribbon. The at least three first identifier pointers define an identification sequence for the optical fiber ribbon.

According to a further aspect, embodiments of the disclosure relate to an optical fiber cable. The optical fiber cable includes a cable or subunit jacket having an inner surface and an outer surface. The inner surface defines a central bore. A plurality of optical fiber ribbons disposed within the central bore. Each optical fiber ribbon of the plurality of optical fiber ribbons includes a plurality of optical fibers.

Each optical fiber of the plurality of optical fibers is arranged adjacently to at least one other optical fiber of the plurality of optical fibers. The plurality of optical fibers have a planar configuration with a first side and a second side. A first set of pointers is disposed on the first side, the second side, or both the first side and the second side. The first set of pointers includes a first starter pointer and at least three first identifier pointers. The first starter pointer is configured to identify a first start of an identification sequence for the optical fiber ribbon defined by the at least three first identifier pointers. The identification sequence for the optical fiber ribbon is unique to the optical fiber ribbon on which the first set of pointers is disposed.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having a ribbon identification pointer system are provided. As described herein, the optical fiber ribbons according to the present disclosure include a series of markings designed to provide a system for easy identification of specific ribbons within large groups of ribbons. Advantageously, the system is expandable to accommodate identification of several thousand ribbons, and thus tens of thousands of fibers, within an optical fiber cable. In general, the pointer system includes a starter pointer that provides a clearly defined starting point from which to read a ribbon identification sequence. Identifier pointers following the starter pointer work in conjunction with the fiber color-coding system to assign a numerical value to each fiber as an identifier of the individual ribbon or as an identifier of a ribbon within a subgroup and/or group of ribbons. Advantageously, the pointers can be applied as droplets of ink, and the ribbon identification pointer system is machine-readable (e.g., like a barcode). Exemplary embodiments will be described in greater detail below, and these exemplary embodiments are provided by way of illustration, and not by way of limitation. These and other aspects and advantages will be discussed in relation to the embodiments provided herein.

In general, the ribbon identification pointer system described herein applies to any optical fiber ribbon type in which a plurality of optical fibers are arranged adjacent each other and can be provided in a planar configuration. A particular example of an optical fiber ribbon 10 is provided in FIG. 1. The optical fiber ribbon 10 includes a plurality of optical fibers 12. In the embodiment depicted, the optical fiber ribbon 10 includes twelve optical fibers 12. However, the number of optical fibers 12 can be greater or fewer than twelve optical fibers 12. For example, the number of optical fibers 12 contained in the optical fiber ribbon 10 may vary from, e.g., four to thirty-six.

Figure 1:
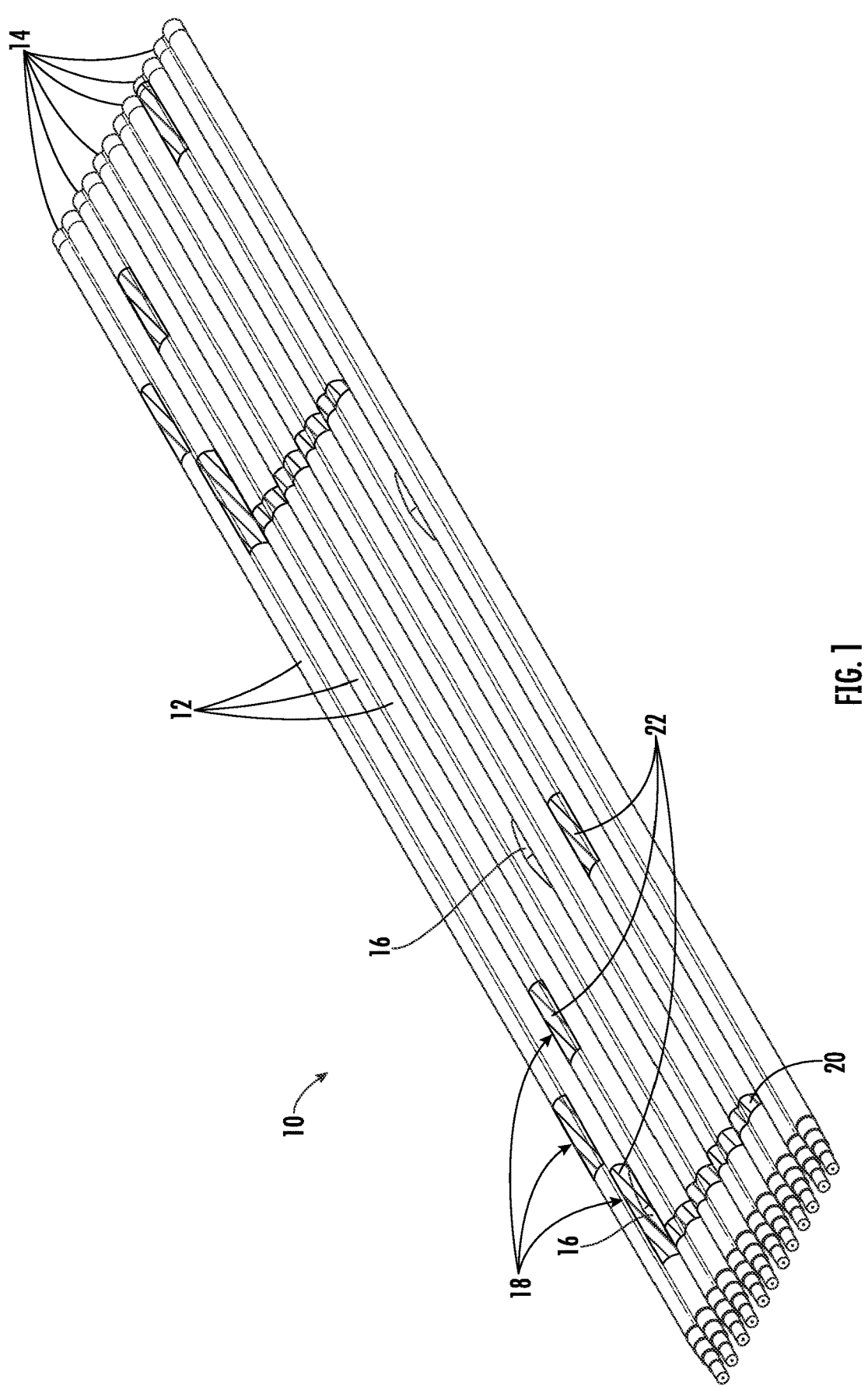
FIG. 1 is partial, perspective view of an optical fiber ribbon having a pointer identification system applied thereto, according to an exemplary embodiment.

In the particular embodiment shown in FIG. 1, the optical fibers 12 are grouped into subunits 14 having two or more optical fibers 12. More particularly, the subunits 14 in the depiction of FIG. 1 each include two optical fibers 12. In embodiments, the optical fibers 12 of each subunit 14 are bonded to each other along the length of the optical fiber ribbon 10, but the subunits 14 are only intermittently bonded along the length of the optical fiber ribbon 10.

FIG. 1 depicts intermittent bonds 16 staggered along the length of the subunits 14. The intermittent bonds 16 between two adjacent subunits 14 may be spaced apart by, e.g., 15 mm to 200 mm. In embodiments, the intermittent bonds 16 are applied in a "wet-on-wet" application process in which the material of the intermittent bond 16 is applied before the material joining the optical fibers 12 of the subunits 14 is (completely) cured. Application of the intermittent bonds 16 in this way creates diffusion of the material of the intermittent bond 16 within the material forming the subunits 14. In embodiments, the optical fiber ribbon 10 has a first configuration in which the optical fibers 12 are arranged in a substantially planar row, which helps to organize the optical fibers 12 for mass fusion splicing. Further, the subunits 14 also can be rolled, curled, or bundled into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the subunits 14 are only held together intermittently along the length of the optical fiber ribbon 10 by the intermittent bonds 16.

In embodiments, the intermittent bonds 16 do not overlap across the width of the optical fiber ribbon 10. That is, no two intermittent bonds 16 have the same longitudinal position on the optical fiber ribbon 10. Put differently, each intermittent bond 16 has a unique longitudinal position on the optical fiber ribbon 10 that is not shared by any other intermittent bond 16 along the length of the optical fiber ribbon 10.

Notwithstanding the foregoing discussion, the presently disclosed ribbon identification pointer system also applies to optical fiber ribbons that are not intermittently bonded along their length, e.g., ribbons in which the optical are fibers bonded to adjacent optical fibers along the entire length of the optical fiber ribbon.

Having described the general structure of an embodiment of the optical fiber ribbon 10, the ribbon identification pointer system is now described. As can be seen in FIG. 1, the optical fiber ribbon 10 is provided with a plurality of pointers 18 along the length of the optical fiber ribbon 10. The plurality of pointers 18 include a starter pointer 20 and identifier pointers 22. The starter pointer 20 comprises markings designed to indicate to a human or machine observer that the subsequent pointers are identifier pointers 22 that will define an identification sequence for a particular ribbon, e.g., by indicating an individualized ribbon identifier number or by identifying a ribbon of a particular ribbon subgroup and/or group.

Figures 2, 3:
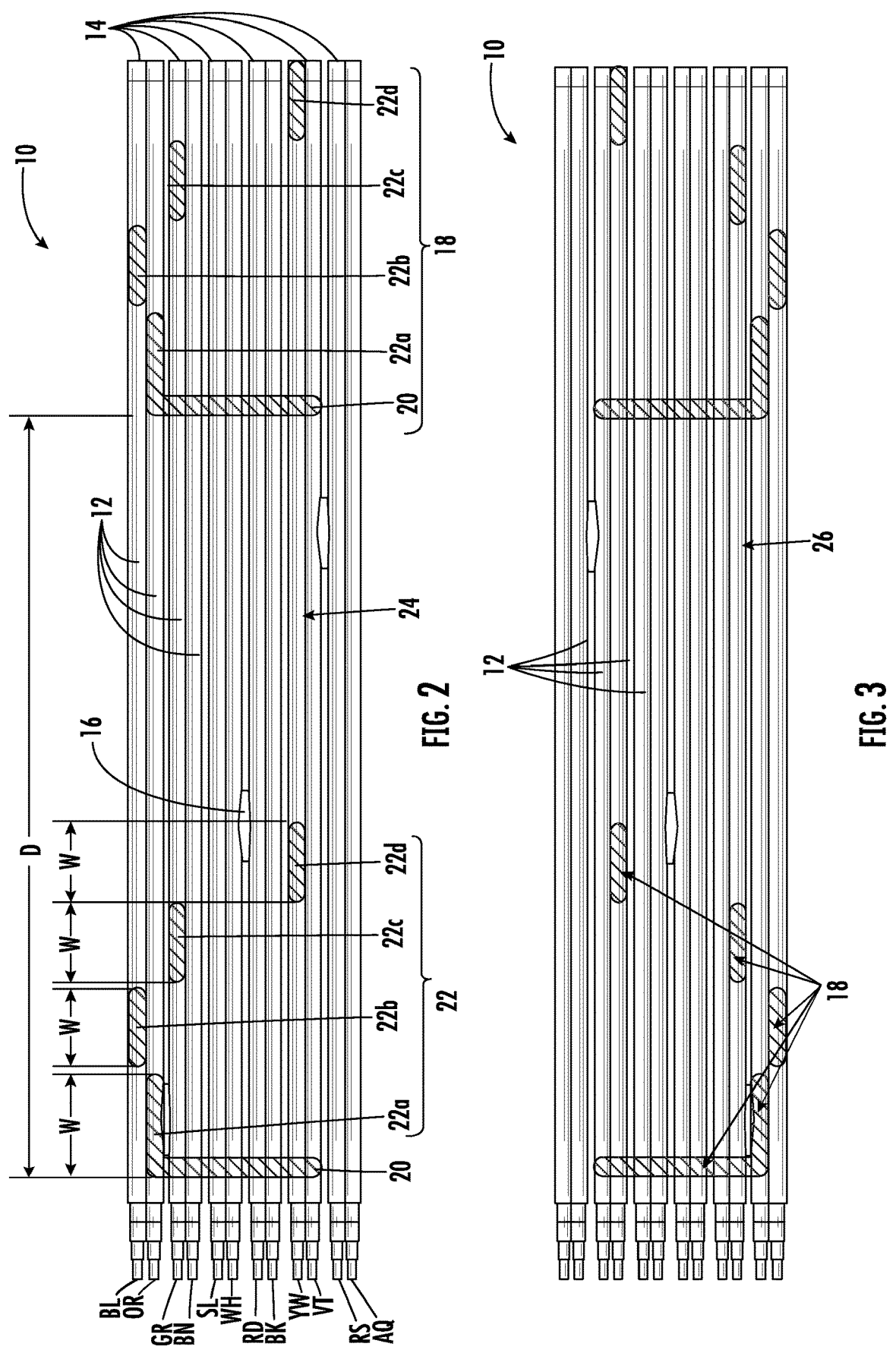
FIG. 2 depicts a top view of the optical fiber ribbon of FIG. 1, according to an exemplary embodiment.
FIG. 3 depicts a bottom view of the optical fiber ribbon of FIG. 2, according to an exemplary embodiment.

With respect to the embodiment shown in FIGS. 1-3, the identifier pointers 22 provide a ribbon identification number based on the combination of fibers 12 on which the identifier pointers 22 are provided starting at the starter pointer 20 and going longitudinally along the optical fiber ribbon 10 to the right. Because the identification system described herein is a base-ten system, the number of optical fibers 12 in the ribbon will be at least ten. In optical fiber ribbons 10 utilizing more than ten optical fibers 12 (such as shown in FIGS. 1-3), only ten of the optical fibers 12 (e.g., the first ten) will be utilized in the numbering system.

In such an embodiment, the first identifier pointer 22a identifies the ones position ($10^0$) of the ribbon identifier number. The first identifier pointer 22a corresponds to a number 0-9. The second and subsequent identifier pointers 22b, 22c provide the rest of the identification sequence, also using a 0-9 numbering scheme. Thus, for example, the second identifier pointer 22b corresponds to the tens position ($10^1$) of the identifier number, the third identifier pointer 22c corresponds to the hundreds position ($10^2$), and the fourth identifier pointer 22d corresponds to the thousands position ($10^3$). The identification system can be expanded as necessary by adding identifier pointers 22 to the system to represent numerical positions of $10^{4+}$.

For the purposes of identification of an optical fiber 12 within an optical fiber ribbon 10, the optical fibers 12 of the optical fiber ribbon 10 are color-coded in embodiments. A typical color coding scheme consists of the following order of colors: blue (BL), orange (OR), green (GR), brown (BN), slate (SL), white (WH), red (RD), black (BK), yellow (YW), violet (VT), rose (RS), and aqua (AQ). This scheme includes twelve colors. For embodiments having fewer than twelve optical fibers, the color code is truncated after based on the number of optical fibers 12 present. For a base-ten system, the minimum number of optical fibers 12 is ten. For embodiments having more than twelve optical fibers, the color code is repeated as necessary (e.g., a thirteenth optical fiber would be blue, a fourteenth optical fiber would be orange, etc.). The color-coding provides an indication of where to start counting the optical fibers 12. Using the above color-coding scheme, the blue optical fiber 12 is the first optical fiber, the orange optical fiber 12 is the second optical fiber, the green optical fiber 12 is the third optical fiber, etc. Table 1, below, provides the number scheme corresponding to this color-coding.

TABLE 1

| Numbering scheme based on color of optical fibers | |
| --- | --- |
| Optical fiber color | $10^{0+}$ |
| Blue | 0 |
| Orange | 1 |
| Green | 2 |
| Brown | 3 |
| Slate | 4 |
| White | 5 |
| Red | 6 |

TABLE 1-continued

| Numbering scheme based on color of optical fibers | |
|---|---|
| Optical fiber color | $10^{0+}$ |
| Black | 7 |
| Yellow | 8 |
| Violet | 9 |

As best depicted in FIG. 2, the ribbon identification sequence corresponds to a first identifier pointer 22a on the orange fiber, a second identifier pointer 22b on the blue fiber, a third identifier pointer 22c on the green fiber, and a fourth identifier pointer 22d on the yellow fiber. Using the number system identified in Table 1, this corresponds to $1(10^0)+0(10^1)+2(10^2)+8(10^3)=8201$. Thus, the ribbon identification sequence corresponding to this combination of identifier pointers 22 is ribbon 8201.

Depending on the number of optical fibers 12 in the optical fiber ribbon 10, the ribbon identification pointer system can identify, e.g., each twelve fiber set within the optical fiber ribbon 10. As mentioned, the color coding scheme repeats after the first twelve optical fibers 12. Thus, a unique identifier can be provided for each set of twelve fibers within the optical fiber ribbon 10. For example, an optical fiber ribbon 10 having twenty-four optical fibers 12 may have two unique identifiers—one for the first set of twelve optical fibers 12 and one for the second set of twelve optical fibers 12. For the base-ten system, only ten optical fibers 12 would be utilized to provide an identification sequence for each ribbon subset. For optical fiber ribbons having more than twelve optical fibers 12 but less than twenty-four optical fibers 12, only ten optical fibers 12 would be used to identify the optical fiber ribbon 10.

In embodiments, the plurality of pointers 18 are deposited on the optical fiber ribbon 10. In embodiments, the plurality of pointers 18 are ink drops printed on the optical fiber ribbon 10 using, e.g., an ink jet printer. Industrial inkjet printing technology and inks known in the art and used in conventional ribbon identification systems can be used to apply the presently disclosed pointer identification system to an optical fiber ribbon. In the ribbon identification pointer system, the starter pointer 20 can take a variety of suitable forms. In the embodiment depicted in FIG. 2, the starter pointer 20 is a substantially continuous line of ink extending across multiple optical fibers 12. In embodiments, the starter pointer 20 covers at least two adjacent or non-adjacent optical fibers 12 at a same longitudinal position. In other embodiments, the starter pointer 20 is an ink having a different color than the color of the identifier pointers 22. In still other embodiments, the starter pointer 20 is an ink drop having a shape different from the shape of the identifier pointers 22. In yet other embodiments, the starter pointer 20 is located on one more optical fibers 12 that is not used to define the identification sequence (e.g., the eleventh or twelfth optical fiber in a base-ten system).

After the starter pointer 20, the identifier pointers 22 are deposited on the optical fiber ribbon 10. In embodiments, each identifier pointer 22 covers a single optical fiber 12, and only one identifier pointer 22 is provided at a given longitudinal position along the length of the optical fiber ribbon 10. In embodiments, the individual ink drops for the identifier pointers 22 have a width W of up to 5 mm, and in embodiments, the width W of the identifier points 22 is at least 1 mm. Further, in embodiments, a longitudinal spacing of 0 mm to 5 mm is provided between an identifier pointer

22 and a subsequent identifier pointer 22. In particular embodiments, the longitudinal spacing is from 0 mm to 2 mm.

In embodiments, the sequence of starter pointer 20 and identifier pointers 22 may be repeated multiple times along the length of the optical fiber ribbon 10. In such an embodiment, the starter pointers 20 for adjacent identification sequences are separated by a distance D of 3 mm to 100 mm, in particular 25 mm to 50 mm. Further, while providing advantages over conventional ribbon print identifiers (discussed below), that does not preclude the use of the disclosed pointer identification system in conjunction with such conventional print identifiers. For example, a conventional alphanumeric print identifier may be included on the ribbon for ease of visual identification by an operator or installer, and the presently disclosed pointer identification system may be provided adjacent to the conventional alphanumeric print identifier for confirmation and/or automation purposes (e.g., using an optical scanner).

Indeed, one particularly advantageous aspect of the disclosed ribbon identification pointer system is the machine-readability of the pointer system. An optical scanner can be used to recognize the starter pointer 20 and to recognize the sequence of identifier pointers 22. In order to ensure accurate reading of the identifier pointers 22, the color of the ink drops deposited on the optical fiber is taken into account. For example, a black ink drop may not be discernable over a black optical fiber. Thus, for example, black ink drops can be deposited over all of the optical fibers except for the black optical fiber, and a different color ink drop (e.g., white or yellow) can be deposited over the black optical fiber. In another embodiment, a single color ink (e.g., black ink) can be used over all of the optical fibers, and the optical scanner can assume that a black dot is deposited (or should be deposited) over the black optical fiber if a predetermined distance along the optical fiber ribbon passes without registering an ink drop. In still another embodiment, the color layer of the optical fiber is ablated away to provide a form of identification based on the absence of expected color. In general, the ribbon identification pointer system uses contrast in the longitudinal direction between the color of the optical fiber 12 and the pointers 18 to define the identification sequence of the optical fiber ribbon 10.

FIG. 2 depicts a first (e.g., upper) side 24 of the optical fiber ribbon 10. In order to further ensure readability of the plurality of pointers 18, it is desirable that the pointers 18 also be readable from the opposite side of the optical fiber ribbon 10. FIG. 3 depicts a second (e.g., lower) side 26 of the optical fiber ribbon 10. As can be seen, the pointers 18 can also be seen from second side 26 of the optical fiber ribbon 10. As discussed above, in embodiments, the optical fibers 12 are arranged in subunits 14 that are only intermittently bonded along the length of the optical fiber ribbon 10. Thus, gaps exist between adjacent subunits 14. When the ink drops are deposited onto the optical fibers, the ink wicks around to cover at least 50%, in particular at least 75%, of the circumference of the optical fiber 12. Additionally, in embodiments, the plurality of pointers 18 are discernible from the second side 26 based on contrast observable through the ink and ribbon coatings.

While the foregoing discussion focused on a base-ten numbering system, the pointer identification system may utilize another numbering system. For example, optical fiber ribbons 10 are often include twelve optical fibers 12 or a multiple of twelve optical fibers 12. Thus, the numbering system can be a base-twelve system. Further, for smaller ribbons, e.g., having less than ten optical fibers 12, the numbering system may be a base-two numbering system. In such embodiments, the base two numbering system may include a starter pointer 20 and eight identifier pointers 22, similar to an eight-bit numbering scheme. The base-two numbering system with eight identifier pointers 22 would provide 255 unique identifiers (with the identifier 000 being omitted).

The ribbon identification pointer system described herein provides several advantages over identification systems that have previously been used. For example, the presently disclosed system uses a series of relatively short, machine-readable ink drop dashes to identify ribbons based on the color of the optical fiber ribbon over which the dash is made. As such, the system makes use of the color-coded optical fiber order already present in the ribbon. In certain conventional systems, an alphanumeric system is used for ribbon identification, but the small size of the ribbon makes visibility difficult. Further, generating enough contrast to distinguish the alphanumeric characters from the underlying color optical fibers is difficult and often requires the application of opaque ribbon coating background layers, which decreases production speed. Still further, the alphanumeric characters and other known marking systems require significantly more print segments and thus space on the cable. Providing unique identification for up to 9,999 ribbons (with the identifier 0000 being omitted) in a base-ten system only requires four identifier pointers.

The relatively short span needed for identification decreases ambiguity, has less effect on ribbon processing speed, and allows for a much smaller label-to-label distance. This last advantage allows personnel to identify the ribbon in much shorter ribbon length than if other conventional print schemes where employed. Further, the small label-to-label spacing reduces the amount of ribbon length/slack required to identify the ribbon, e.g., during a mass fusion splicing operation when the amount of ribbon length is limited due to limited slack within an enclosure. In addition, this identification and verification of the ribbon is important in the creation of a preconnectorized cable assembly where the length of the ribbon between the connector and the cable is limited.

Figure 4:
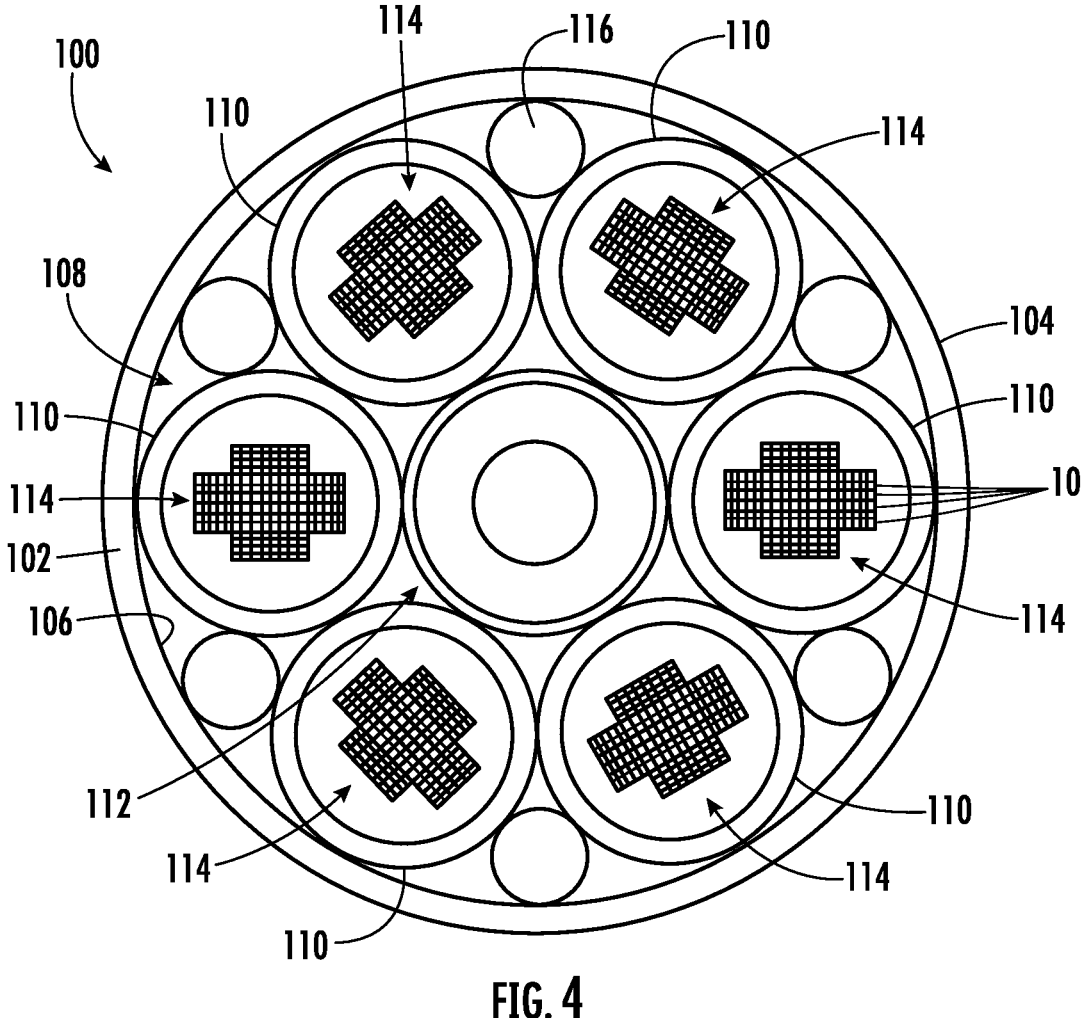
FIG. 4 depicts a cable construction containing a plurality of optical fiber ribbons having the pointer identification system applied thereto, according to another exemplary embodiments.

FIG. 4 depicts an example of an optical fiber cable 100 including a plurality of optical fiber ribbons 10 including the pointer identification system as described herein. As can be seen in FIG. 4, the optical fiber cable 100 includes a cable jacket 102 having an outer surface 104 and an inner surface 106. In embodiments, the outer surface 104 defines an outermost surface of the optical fiber cable 100. Further, in embodiments, the inner surface 106 defines a central bore 108 that extends along at least a portion of the length of the optical fiber cable 100. Disposed within the central bore 108 are a plurality of subunits 110 stranded around a central member 112 (e.g., a central strength member). In the embodiment depicted, each subunit 110 includes a jacket surrounding a ribbon stack 114 containing a plurality of optical fiber ribbons 10. As can be seen, the number of ribbon stacks 114 and the number of optical fiber ribbons 10 in each stack 114 demonstrates that optical fiber cables 100 can carry several hundreds or even thousands of optical fibers. For example, the ribbon stacks 114 may include 288 optical fibers arranged in a first block of four twelve-fiber ribbons, a second block of eight twenty-four-fiber ribbons, and a third block of four twelve-fiber ribbons. For the six ribbons stacks 114, that equates to 1728 optical fibers. In order to connectorize the appropriate optical fibers, the pointer identification system allows a quick and machine-readable way to identify individual ribbons, and thus particular fibers.

FIG. 4 depicts just one example construction of an optical fiber cable 100. Other optical fiber cable constructions are possible. For example, as shown in FIG. 4, the optical fiber cable 100 can included additional elements in the central bore 108, such as filler rods 116, armor layers, flame retardant fillers, strengthening yarns/rods, etc. Further, in embodiments, the optical fiber cable 100 may include a slotted core in which a divider partitions the central bore 108 into a plurality of slots containing the optical fiber ribbons 10. In still other embodiments, the optical fiber cable 100 may be a stranded tube construction in which a plurality of subunits 110 are wound around a central member 112 without a cable jacket 102 containing the subunits 110. In yet other embodiments, the optical fiber cable 100 includes a plurality of optical fiber ribbons 10 loosely held within the central bore 106 of the cable jacket 102, and the optical fiber ribbons 10 may be in a planar, rolled, curled, or bundled configuration. These example cable constructions are provided for the purposes of illustration and not limitation. Other cable constructions not specifically discussed herein may also include the optical fiber ribbons 10 having the pointer identification system applied thereto.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
a plurality of optical fibers, each optical fiber of the plurality of optical fibers arranged adjacently to at least one other optical fiber of the plurality of optical fibers, the plurality of optical fibers having a planar configuration with a first side and a second side;
a first set of pointers disposed on the first side, the second side, or both the first side and the second side, the first set of pointers comprising a first starter pointer and at least three first identifier pointers, the first starter pointer configured to identify a first start of an identification sequence for the optical fiber ribbon defined by the at least three first identifier pointers;
wherein the first starter pointer is different in at least one of size or shape as compared to each of the at least three first identifier pointers.

2. The optical fiber ribbon of claim 1, wherein the first set of pointers comprises ink drops.

3. The optical fiber ribbon of claim 2, wherein each ink drop covers at least 50% of a circumference of an optical fiber on which the ink drop is deposited.

4. The optical fiber ribbon of claim 1, wherein the first starter pointer extends across more than one optical fiber of the plurality of optical fibers.

5. The optical fiber ribbon of claim 4, wherein each first identifier pointer of the at least three first identifier pointers only covers one optical fiber of the plurality of optical fibers.

6. The optical fiber ribbon of claim 5, wherein each first identifier pointer has a width that is parallel to a longitudinal axis of the optical fiber ribbon and wherein the width is 5 mm or less.

7. The optical fiber ribbon of claim 1, further comprising a second set of pointers disposed on the first side, the second side, or both the first side and the second side, the second set of pointers comprising a second starter pointer and at least three second identifier pointers, the second starter pointer configured to identify a second start of the identification sequence for the optical fiber ribbon defined by the at least three second identifier pointers.

8. The optical fiber ribbon of claim 7, wherein the first starter pointer is separated from the second starter pointer by a distance of 3 mm to 100 mm.

9. The optical fiber ribbon of claim 1, wherein the plurality of optical fibers are arranged into subunits of at least two optical fibers.

10. The optical fiber ribbon of claim 9, wherein the subunits are intermittently joined by bonds along a length of the optical fiber ribbon.

11. The optical fiber ribbon of claim 10, wherein each bond has a unique longitudinal position along the length of the optical fiber ribbon.

12. A method of identifying an optical fiber ribbon, the optical fiber ribbon comprising a plurality of optical fibers, each optical fiber of the plurality of optical fibers arranged adjacently to at least one other optical fiber of the plurality of optical fibers, the plurality of optical fibers having a planar configuration with a first side and a second side, the method comprising:

forming a first starter pointer on the first side of the optical fiber ribbon, the first starter pointer being configured to identify a first start of an identification sequence for the optical fiber ribbon;

forming at least three first identifier pointers on the first side of the optical fiber ribbon, the at least three first identifier pointers defining the identification sequence for the optical fiber ribbon;

wherein the first starter pointer is different in at least one of size or shape as compared to each of the at least three first identifier pointers.

13. The method of claim 12, wherein forming the first starter pointer comprises printing one or more ink drops onto the first side of the optical fiber ribbon at a single longitudinal position and wherein forming the at least three first identifier pointers comprises printing at least three ink drops onto the first side of the optical fiber ribbon, each ink drop at a different longitudinal position.

14. The method of claim 13, wherein each ink drop covers at least 50% of a circumference of an optical fiber on which the ink drop is printed.

15. The method of claim 12, further comprising:

forming a second starter pointer on the first side of the optical fiber ribbon;

forming at least three second identifier pointers on the first side of the optical fiber ribbon, the at least three second identifier pointers defining the identification sequence for the optical fiber ribbon.

16. The method of claim 15, wherein the first starter pointer is deposited 3 mm to 100 mm away from the second starter pointer.

17. The method of claim 12, wherein each first identifier pointer has a width parallel to a longitudinal axis of the optical fiber ribbon, the width being 5 mm or less.

18. An optical fiber cable, comprising:

a cable or subunit jacket comprising an inner surface and an outer surface, the inner surface defining a central bore;

a plurality of optical fiber ribbons disposed within the central bore, wherein each optical fiber ribbon of the plurality of optical fiber ribbons comprises:

a plurality of optical fibers, each optical fiber of the plurality of optical fibers arranged adjacently to at least one other optical fiber of the plurality of optical fibers, the plurality of optical fibers having a planar configuration with a first side and a second side;

a first set of pointers disposed on the first side, the second side, or both the first side and the second side, the first set of pointers comprising a first starter pointer and at least three first identifier pointers, the first starter pointer configured to identify a first start of an identification sequence for the optical fiber ribbon defined by the at least three first identifier pointers, wherein the first starter pointer is different in at least one of size or shape as compared to each of the at least three first identifier pointers;

wherein the identification sequence for the optical fiber ribbon is unique to the optical fiber ribbon on which the first set of pointers is disposed.

19. The optical fiber cable of claim 18, wherein the first set of pointers comprises ink drops.

20. The optical fiber cable of claim 19, wherein each ink drop covers at least 50% of a circumference of an optical fiber on which the ink drop is disposed.

* * * * *